UNITED STATES PATENT OFFICE.

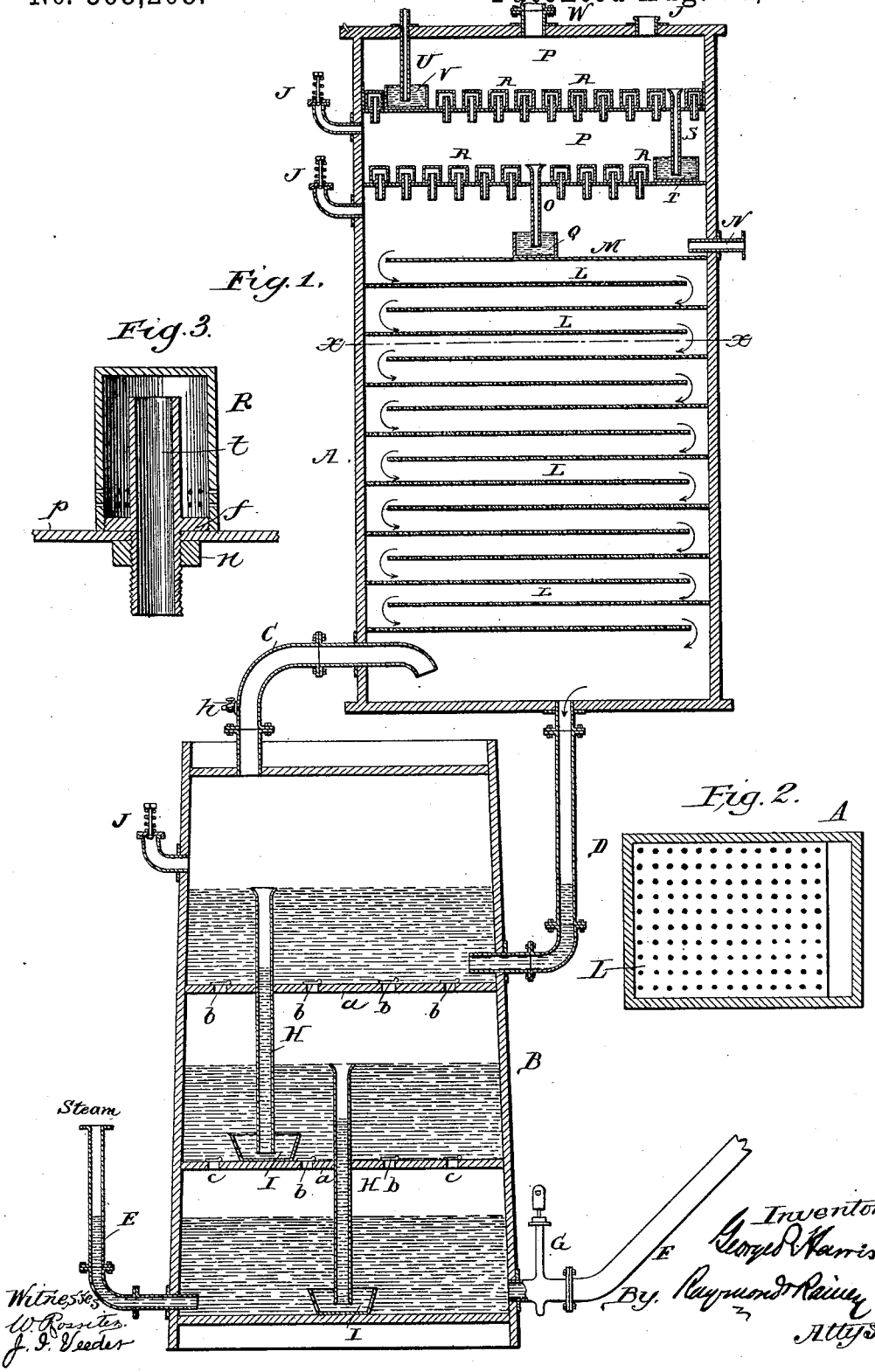

GEORGE P. HARRIS, OF CHICAGO, ILLINOIS.

STILL.

SPECIFICATION forming part of Letters Patent No. 368,208, dated August 16, 1887.

Application filed May 5, 1886. Serial No. 201,157. (No model.)

*To all whom it may concern:*

Be it known that I, GEORGE P. HARRIS, of Chicago, in the county of Cook and State of Illinois, have invented certain new and useful Improvements in Stills, of which the following is a sufficient specification.

My invention consists in a new and improved still or combination of stills, by which the operation of distillation is effected in a thorough and economical manner, with diminished liability to loss, and in which the process need not be interrupted for the purpose of cleaning the pipes or passages of the still.

In the drawings, Figure 1 is a vertical section of my improved distilling apparatus, with as many of its connections as are necessary to illustrate my invention. Fig. 2 is a horizontal section on line $xx$, Fig. 1. Fig. 3 is a section of the vapor-pipe R.

A, Fig. 1, is a rectangular-box still containing within it the copper plates M L L, &c. These plates are fitted closely to three sides of the still A, as shown in Fig. 2, and slope toward the open fourth side. It will be seen that with the construction shown there is no possibility of the obstruction of the still, such as occurs when the mash has to pass through the traps or overflow-pipes, which form the usual passage from one plate to the next. The plates are, with the exception of the top plate, M, preferably perforated with numerous small holes. The mash or beer inlet N is just above the plate M.

In the upper portion of A are located the low-wine or rectifying chambers P P, formed by plates extending entirely across the still. In these plates are inserted vapor-pipes R R, &c., of the structure shown and hereinafter described. The overflow-pipes S O project several inches above the bottoms of the low-wine chambers, though not quite so high as the top of the vapor-pipes R R. The liquid in the pans T Q forms seals, which prevent the ascent of vapor through the overflow-pipes S O.

J J J are valves for the admission of air in case a vacuum should be accidentally formed within the still.

W is a pipe leading to the first condenser or "goose," surrounded with warm water, and thence to the final condenser or "worm," surrounded by cold water.

U is a pipe which carries the condensed low wines from the goose back to the low-wine chamber P.

The chamber A thus includes both a distilling apparatus formed by plates M, L, L, &c., below the mash-inlet N, and a rectifying apparatus formed by the low-wine chambers P P, situated above the mash-inlet N. For the sake of distinguishing it from the reservoir B, in which no distillation commonly takes place, I shall, however, call chamber A a "still," especially as the location of the rectifying-chambers P P in the distilling-column A is only a matter of convenience. The rectifying or low-wine chambers P P, whether two or more in number, might be located in a separate column—as in Patent No. 128,291, to Druding—without altering the action of my invention, the principal feature of said invention being the addition of a reservoir to a still of the structure shown and described, and which still, by reason of the small quantity of liquid it contains and the rapidity with which such liquid passes through it, is liable to loss of spirits, said reservoir being capable of holding a considerable quantity of liquid, and aiding the detection and prevention of loss of spirits by reason of its structure and connections, as hereinafter set forth.

Below the still A is a reservoir, B, divided by plates or partitions $a\,a$ into chambers. Of these chambers there may be a greater or less number; but two or three will usually suffice. The plates $a\,a$ have overflow-pipes H H and pans I I, arranged as shown, and contain apertures $c\,c$, &c., covered by valves $b\,b$, &c. Steam enters through the pipe E.

F is the blow-off pipe leading to the slop-tub.

G is a stop-valve for regulating the flow to the slop-tub, so that the depth of liquid shall be maintained as nearly constant as possible in the lower chamber of the still B.

The slop-tub should be so located that the pressure of steam—say four pounds or thereabout—in the lower chamber of B will suffice to drive the slop into it.

As the slop-tub, goose, worm, &c., do not differ from those in ordinary use, they are not shown.

Stills A and B are connected by the vapor-pipe C, in which is inserted the petcock $h$ and the return-pipe D.

R, Fig. 3, is the outer shell of the vapor-pipe to the low-wine chamber. It is pierced with holes near its lower edge, and is fitted close to the flange $f$ of the tube $t$. This tube is threaded below the flange to take the nut $n$, by which the whole is secured in the plate $p$, forming the bottom of the low-wine chambers. By using a perforated cap, secured as shown, I produce a boiling-pipe, which is not only cheap and convenient, but which diffuses the vapor so as to produce a gentle and uniform boiling of the low-wine.

The operation is as follows: Steam is admitted through the pipe E. The mash or beer, heated by being pumped through a coil located in the tub of hot slop, is pumped into A through the pipe M. It flows over the plate M, falling from its edge in a broad thin sheet, and thus flows from one plate to the next until it reaches the pipe B, being in its entire course exposed to the steam or vapor from the still B. The spirits should be all vaporized by the time the mash reaches the pipe D, but if any should remain it would be extracted during its passage to the reservoir B. The odor of the vapor passing through the pipe C will show the presence or absence of spirits in the contents of B. The pipe C is tapped and a petcock, $h$, inserted, for the purpose of testing the vapor. The course of the mash through the reservoir B to its exit as slop through F is obvious. The course of the steam or vapor is through the valve-openings $c$ $c$, &c., the vapor-pipe C, through the perforations and plates L L, &c., the vapor-pipes R R, &c., the pipe W to the goose, and thence to the worm. During this ascent the character of the vapor is continually changing. When it starts, it is hottest and consists entirely of water. It gradually vaporizes the alcohol, and becoming cooler loses more and more of its water. Arriving at the goose, the more watery portions are condensed and return through the pipe U, only the lighter or more alcoholic spirits reaching the final condenser or worm.

The reservoir B in my combination not only forms a perfect check on the still A by showing at once whether all the spirit is being obtained and by extracting any residue left by A, but it also forms a reducer for the steam-pressure necessary to complete the boiling and expel the slop, so that when the vapor reaches the still A it is so reduced in pressure and flows so quietly as to perform its work most efficiently and not interfere with the downward flow of the mash.

The mash, not being compelled to pass through traps or overflow-pipes in the upper still, can be and is spread out in a large thin sheet, and is thus thoroughly exposed to the action of the vapor, while the size of the pipes and the depth of liquid in the lower still prevent its clogging.

I am aware that stills have been constructed having perforated plates arranged as in chamber A, and also that stills have been constructed having divisions connected by traps in a manner similar to that shown in chamber B, (reference being made more particularly to Letters Patent Nos. 117,890 and 128,291,) and I do not, therefore, broadly claim such construction when used separately.

I claim—

The combination of a still, A, containing a series of plates situated below the mash-inlet and closely attached to three sides of the walls of said still, and as to the fourth side alternately open at opposite sides, with a reservoir, B, divided into two or more chambers by partitions $a$ $a$, extending entirely across it, said partitions being provided with overflow-pipes and traps, and with valved openings for the ascent of vapor, the still A being connected by vapor-pipes C, having a petcock, $h$, and by pipe D, for carrying the descending liquid, said reservoir B being provided with a pipe, E, for the admission of steam, all substantially as set forth.

GEO. P. HARRIS.

Witnesses:
  P. H. T. MASON,
  J. I. VEEDER.